United States Patent [19]

Ikegami et al.

[11] Patent Number: 4,469,062
[45] Date of Patent: Sep. 4, 1984

[54] INTAKE PORT OF INTERNAL COMBUSTION ENGINE

[75] Inventors: Shinzi Ikegami; Koichi Tezuka, both of Tokyo, Japan

[73] Assignee: Nissan Motor Company, Limited, Japan

[21] Appl. No.: 435,660

[22] Filed: Oct. 21, 1982

[30] Foreign Application Priority Data

Oct. 29, 1981 [JP] Japan .................. 56-172087

[51] Int. Cl.³ .................. F02F 1/42; F01L 3/00
[52] U.S. Cl. .................. 123/306; 123/188 M; 123/262
[58] Field of Search .................. 123/188 M, 262, 306

[56] References Cited

U.S. PATENT DOCUMENTS

| | | | |
|---|---|---|---|
| 3,824,971 | 7/1974 | Skatsche et al. | 123/188 M |
| 3,874,357 | 4/1975 | List et al. | 123/188 M |
| 3,890,949 | 6/1975 | Elsbett et al. | 123/188 M |
| 4,095,578 | 6/1978 | Allara et al. | 123/188 M |
| 4,308,832 | 1/1982 | Okumura et al. | 123/188 M |
| 4,312,309 | 1/1982 | Nakanishi et al. | 123/188 M |

FOREIGN PATENT DOCUMENTS 54-58129  5/1979  Japan .................. 123/188 M
844352  7/1958  United Kingdom .......... 123/188 M Primary Examiner—Craig R. Feinberg
Assistant Examiner—David A. Okonsky
Attorney, Agent, or Firm—Leydig, Voit, Osann, Mayer and Holt, Ltd.

[57] ABSTRACT

In an internal combustion engine including a combustion chamber in a cylinder, an intake port communicated with the combustion chamber at an upper portion of the cylinder, and an intake valve for controlling intake air which flows from the intake port into the combustion chamber at the upper portion of the cylinder, the intake port turns around a valve shaft of an intake valve in a spiral shape so as to produce swirls in the cylinder. The axis of the intake valve is positioned at the plane passing the central axis of the cylinder. The axis of the major intake air flow at an entrance of the intake port is positioned at one side of or out of the plane. The axis of the major intake air flow extends to intersect an inner turning wall of a turning portion of the intake port. The inner turning wall further passes the plane from the one side of the plane to the other side of the plane. The inner turning wall thereafter turns around the valve shaft of the intake valve and extends to pass again the plane from the other side to the one side of the plane.

5 Claims, 11 Drawing Figures

INTAKE PORT OF INTERNAL COMBUSTION ENGINE

BACKGROUND OF THE INVENTION

This invention relates to an internal combustion engine having a spiral shaped intake port.

Such a spiral intake port is used to produce swirls of intake air in a combustion chamber in a cylinder of an internal combustion engine.

FIGS. 1 and 2 show such a conventional spiral intake port as disclosed on page 44 of the magazine "Service Shuho" No. 436 published by Nissan Motor Company Limited in March 1981. An intake valve 2 and an exhaust valve 3 face a combustion chamber of a cylinder 1. The axis of the intake valve 2 and the axis of the exhaust valve 3 are positioned at the plane X passing through the central axis 0 of the cylinder 1. A spiral intake port 5 is formed in a cylinder head 4 of the cylinder 1.

The spiral intake port 5 is formed such that it turns around an intake valve shaft 2a of the intake valve 2 in a spiral shape. The spiral port 5 has a turning portion 5A and an approach portion 5B. The approach portion 5B is positioned at one side of or out of the plane X. The intake passage of the turning portion 5A extends to intersect the plane X and passes beyond the plane X from said one side to the other side thereof in a spiral shape. The axis Y of the major intake air in the approach portion 5B at an entrance thereof extends to intersect the outer wall 5o of the turning portion 5A.

In such a conventional spiral intake port, the majority of intake air is turned by means of the outer wall 5o of the turning portion 5A after it has passed the approach portion 5B. After the intake air directly flows into the cylinder 1, the large swirls are produced along the inner surface of the cylinder 1.

For such a reason, at a piston intake stroke, large swirls are produced along the inner surface of the cylinder 1 while some vacuum portion occurs at the center of the cylinder 1. Such vacuum portion is apt to prevent the swirls from remaining during piston compression stroke.

Thus, after an ignition plug 8 sparks the combustion speed decreases so that the flame propagation speed becomes low.

SUMMARY OF THE INVENTION

An object of this invention is to provide an internal combustion engine in which such defects of a conventional engine having a spiral intake port can be eliminated.

According to this invention, an internal combustion engine includes a cylinder, an intake port communicated with the cylinder, and an intake valve for controlling intake air which flows from the intake port into the cylinder. The intake valve has a valve shaft. The intake port turns around the valve shaft in a spiral shape so as to produce swirls in the combustion chamber of the cylinder. Such swirls according to this invention have substantially no vacuum portion at the center of the cylinder even during a piston compression stroke. The majority of intake air flowing through the approach portion of the intake port runs directly against an inner surface of a turning portion of the intake port and then turns from one side of the intake port to the other side thereof.

After that, the intake air again turns in another direction from the other side to said one side of the air intake. Therefore, strong and small swirls are produced near the exit of the intake port at the intake valve. After the intake air flows into the cylinder, the sizes of swirls gradually increase. At the upper dead center of a piston compression stroke, the sizes of swirls are biggest.

Fuels and intake air are properly mixed so that air can be used at a high rate. The flame propagation speed is increased thereby to improve fuel consumption and exhaust-gas characteristics.

BRIEF DESCRIPTION OF THE DRAWINGS

This invention will become more apparent from the following description of a preferred embodiment of this invention when taken in conjunction with accompanying drawings in which.

DETAILED DESCRIPTION OF THE PREFERRED EMBODIMENT

Figure 1:
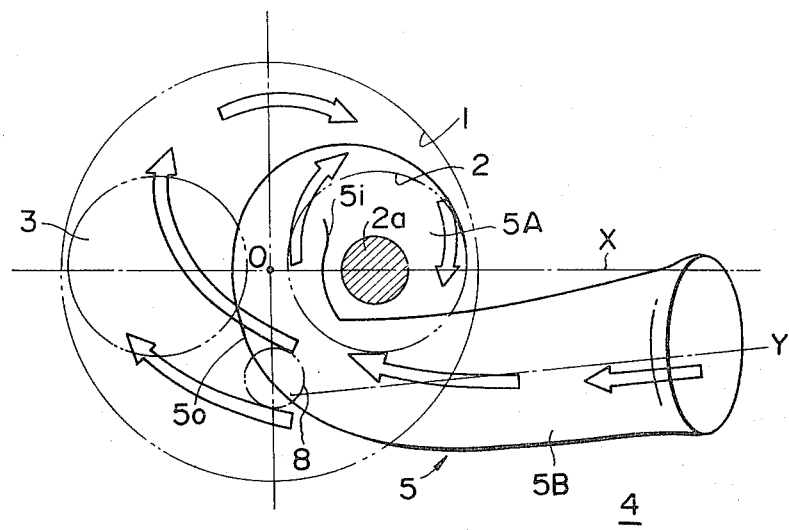
FIG. 1 is a plan view schematically showing a conventional spiral intake port type internal combustion engine.
Figure 3:
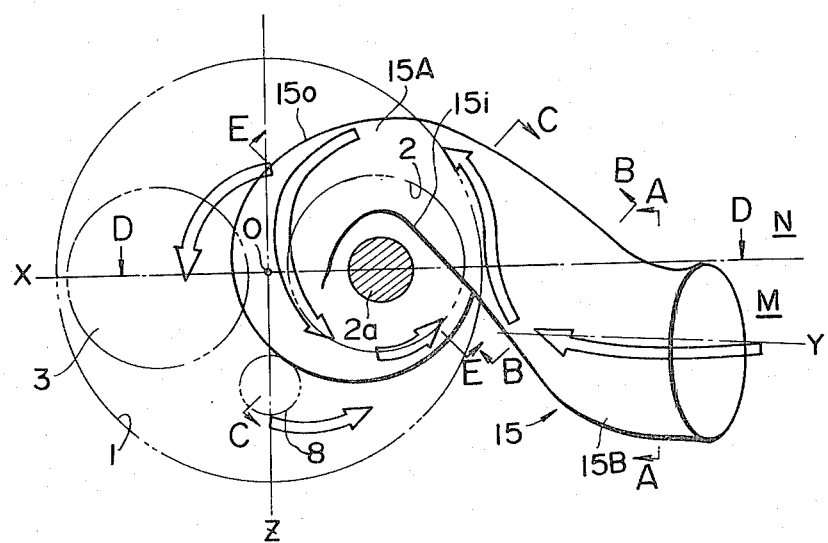
FIG. 3 is a plan view showing a spiral intake port type internal combustion engine according to this invention.
Figure 2:
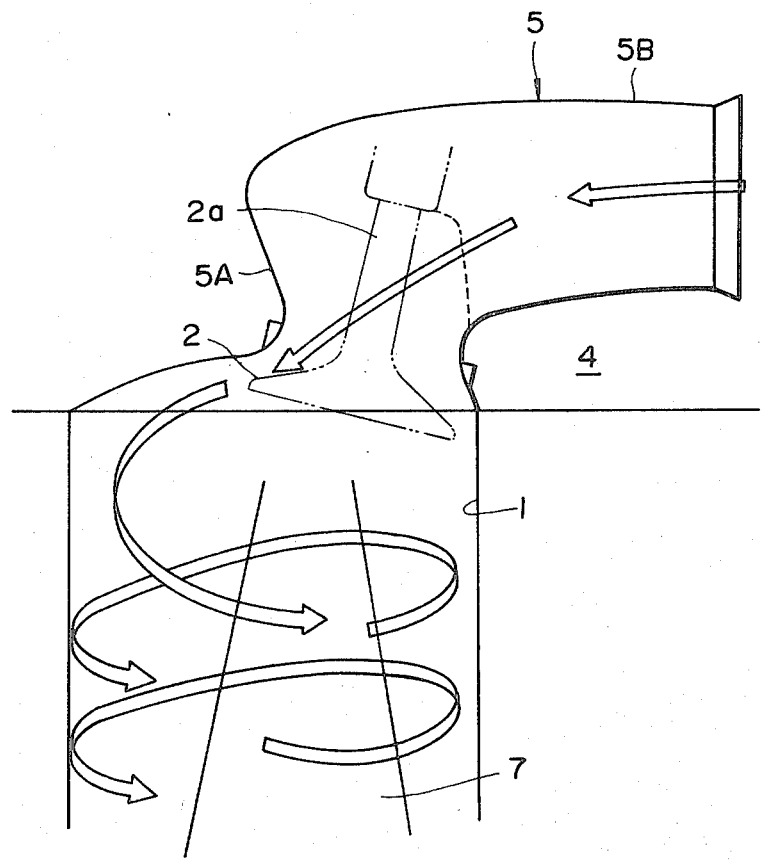
FIG. 2 is a vertical sectional view of the conventional engine shown in FIG. 1.

Referring to FIG. 3, a cylinder 1, an intake valve 2 and an exhaust valve 3 are arranged in a conventional manner, so that they will not be explained in detail. The plane X passes through the central axis 0 of the cylinder 1, the axis of the intake valve 2 and the axis of the exhaust valve 3.

An ignition plug 8 is attached to the cylinder 1 in a conventional manner. In each of the plural cylinders, the axis of the ignition plug 8 is placed at the plane Z which is perpendicular to the plane X and passes through the central axis of the cylinder 1.

A spiral intake port 15 is communicated with a combustion chamber of the cylinder 1. The spiral intake port 15 has a turning portion 15A and an approach portion 15B connected thereto. The turning portion 15A turns around a valve shaft 2a of the intake valve 2 in a spiral shape. The turning portion 15A consists of an inner turning wall 15i and outer turning wall 15o. An entrance portion of the approach portion 15B is formed such that the axis Y of the major intake air flowing through the approach portion 15B is positioned on one side of or completely out of the plane X. The axis Y extends so as to intersect a fore section of the inner surface of the inner turning wall 15*i* and pass beyond it as shown in FIG. 3.

The fore section of inner turning wall 15*i* is arranged so as to pass the plane X from one quadrant or side M to the other quadrant or side N inclined in a forward direction. In other words, the inner turning wall 15*i* of said intake port has a first turning section which passes across the plane X at a small or acute angle to the plane X. After that, the inner turning wall 15*i* turns around the valve shaft 2*a* of the intake valve 2 in a spiral shape and again turns from the other side N to the original quadrant or side M. The inner turning wall 15*i* goes slightly beyond the plane X.

As can be seen from FIG. 3, the axis Y of the major intake air flowing through the approach portion 15B at the entrance of the approach portion 15B is positioned at said one side of or completely out of the plane X.

The approach portion 15B turns largely toward the other side N and passes the plane X. Thereafter, the turning portion 15A connected to the approach portion 15B is formed in a spiral shape around the valve shaft 2*a*. Thus, a shape of both the approach portion 15B and the turning portion 15A in combination is similar to a question mark "?". The inner turning wall 15*i* turns counterclockwise around the valve shaft 2*a* at an angle 180°. Thus, a sufficient length of intake air flow passage can be obtained in the turning portion 15A.

Figure 5:
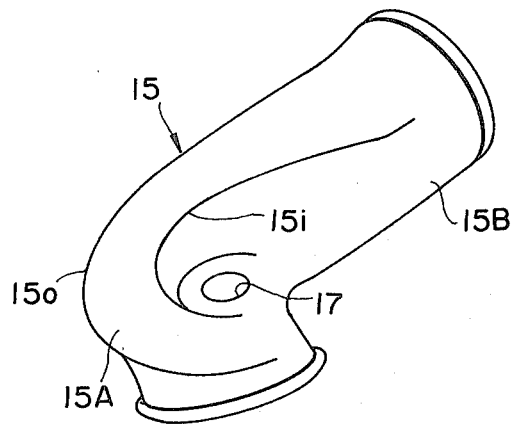
FIG. 5 is a perspective view schematically showing a core for making the spiral port shown in FIG. 3.
Figure 6:
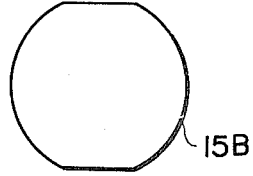
FIG. 6 is a schematic end view showing of an entrance of the spiral port shown in FIG. 5.
Figure 7:
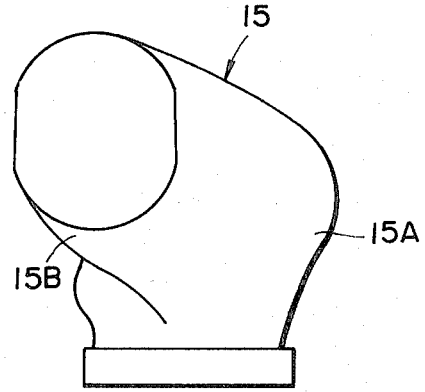
FIG. 7 is a sectional view taken along the lines A—A of FIG. 3.
Figure 8:
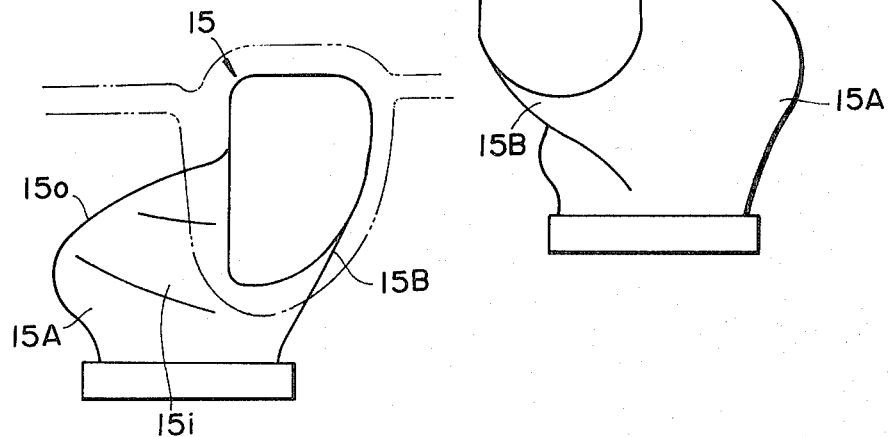
FIG. 8 is a sectional view taken along the line B—B of FIG. 3.
Figure 9:
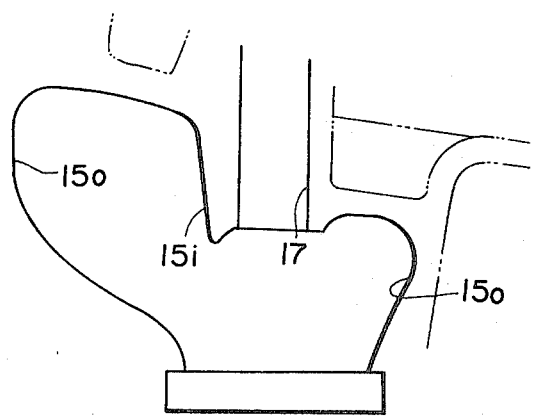
FIG. 9 is a sectional view taken along the line C—C of FIG. 3
Figure 10:
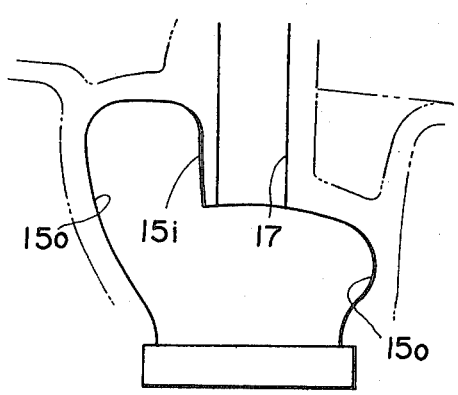
FIG. 10 is a sectional view taken along the line D—D of FIG. 3.
Figure 11:
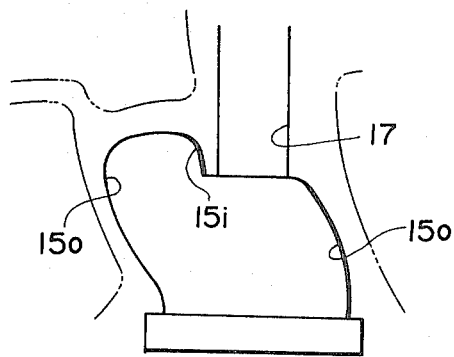
FIG. 11 is a sectional view taken along the line E—E of FIG. 3.

In FIG. 5, the reference 17 designates an opening for a valve stem (not shown).

In operation, intake air flows by way of an engine air cleaner (not shown) and an intake manifold (not shown) to the entrance of the approach portion 15B of the spiral intake port 15. The majority of the intake air runs directly against the inner turning wall 15*i* because the axis Y of the major intake air at the entrance intersects the inner turning wall 15*i* as shown in FIG. 3.

As a result, the intake air largely turns toward the outer turning wall 15*o*. The intake air guided by the outer turning wall 15*o* again turns in another direction. After that, swirls are produced by the turning portion 15A.

Because the inner turning wall 15*i* is arranged around the valve shaft 2A of the intake valve 2 within a wide range, i.e., at more than 180, the intake air is surely guided thereby through a sufficient length of the turning portion 15A. When the intake air flows along the inner turning wall 15*i*, any part of it never flows into the cylinder 1. Therefore, sufficient strong swirls of small radius of curvature can be obtained within the turning portion 15A. Such swirls are introduced into the cylinder 1 from the exit of the intake port 15 at the intake valve 2.

Figure 4:
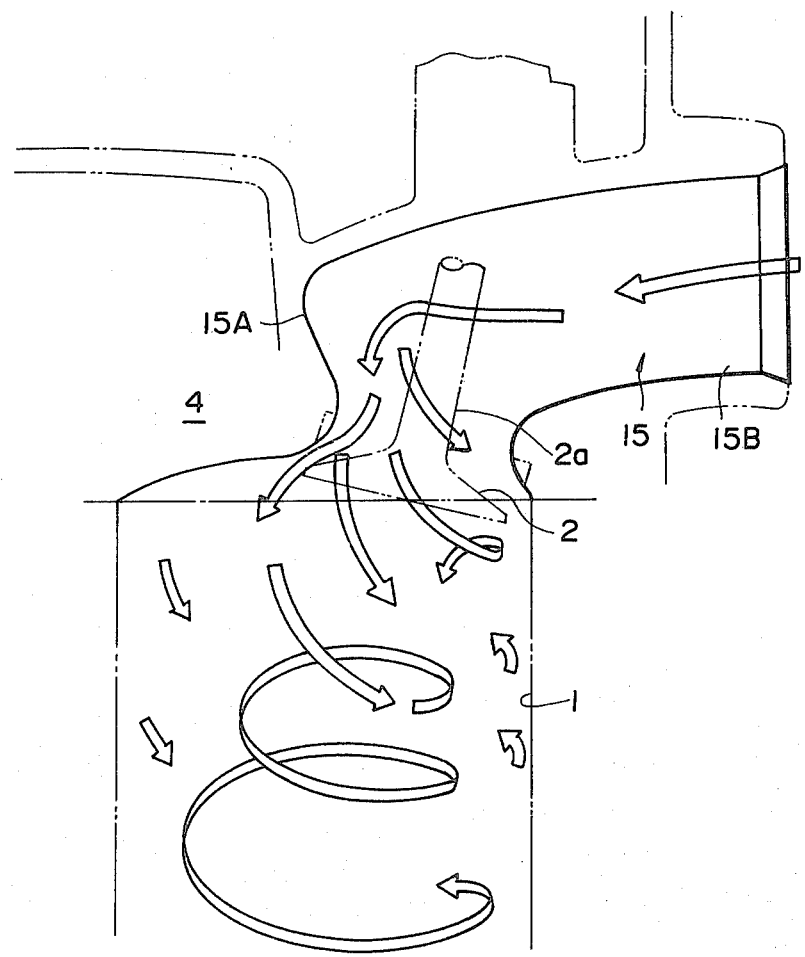
FIG. 4 shows a vertical section of the internal combustion engine having the spiral intake port shown in FIG. 3.

Accordingly, such strong swirls of a small radius of curvature are produced near the exit of the spiral port 15 in an upper central portion of the cylinder 1. The radius of curvature of the intake air gradually increases within the cylinder as best shown in FIG. 4. At the same time, the swirls move further down.

The major swirls are formed within an upper space of the cylinder 1 at the center portion thereof. It means that no vacuum portion occurs at the center of the cylinder unlike an prior art spiral intake port of the internal combustion engine.

Accordingly, the ignition plug can spark the mixture which is in a condition of strong swirls. Thus, the sparking characteristics are excellent. Also the flame propagation speed is very high. The intake air can be effectively utilized at a high rate. As a result, fuel consumption can be remarkably improved. Also, emission characteristics can be improved.

It is preferable that the whole of the entrance portion of the spiral port 15 is placed at one side of the plane X as shown in FIG. 3. In other words, the entrance portion of the spiral port 15 is completely out of the plane X. In such a case, the intake air can be guided by means of a large and long spiral passage (the spiral intake port 15) so as to produce more strong swirls of small radius of curvature in an upper central portion of the cylinder 1.

FIGS. 5 to 11 show a core for making a spiral intake port 15 instead of the spiral intake port according to this invention. The corresponding shape of the spiral intake port 15 shown by chain lines can be made by such a core.

As can be seen from the foregoing, according to this invention, the majority of the intake air in the approach portion of the intake portion abuts directly against the inner turning portion of the intake port so as to be largely turned clockwise toward the outer turning wall. Thereafter, the major intake air is turned counterclockwise by the outer turning wall as well as the very long inner turning wall around the valve shaft at an angle of more than 180 degrees. As a result, strong swirls of small radius of curvature can be obtained even in the intake port. For such a reason, when the intake air reaches the combustion chamber of the cylinder, sufficiently strong swirls of small radius of curvature are produced so that no vacuum phenomenon occurs at the center of the swirls. Further, as the swirls move down within the cylinder, the size of the swirls gradually increases while some disturbed air flows are produced outside of the swirls. Accordingly, even at the top dead center of the piston compression stroke, such strong swirls and small disturbed air flows remain as such. The sparking characteristics are excellent. The flame propagation speed is extremely high. The intake air can be utilized at a high rate. Also, the fuel consumption and the emission characteristics can be improved.

What is claimed is:

1. An internal combustion engine including a combustion chamber in a cylinder, an exhaust port in communication with the combustion chamber at an upper portion of the cylinder, an intake port in communication with the combustion chamber at an upper portion of the cylinder, the intake port having an approach portion and a turning portion connected thereto which have an inner turning wall and an outer turning wall, respectively, an exhaust valve for controlling exhaust of combustion gases from the combustion chamber to the exhaust port, and an intake valve for controlling intake air which flows in a direction from the intake port into the combustion chamber, the intake valve having a valve shaft, the turning portion of the intake port turning around the valve shaft of the intake valve in a spiral shape so as to produce swirls in the cylinder, the axis of the intake valve shaft being positioned at a plane passing through a central axis of the cylinder, the improvement comprising:
the intake port having an entrance portion preceding the approach portion, the entrance portion of the intake port being positioned completely out of the plane;
the entrance portion of the intake port being so constructed and arranged that a major portion of the air flow entering the entrance portion forms a central axis, the central axis of the major air flow extending to intersect a fore section of the inner turning wall of the turning portion of the intake port;

the fore section arranged in the direction of air flow and crossing the plane from one side of the plane to the other side of the plane and being inclined in a forward direction;

the turning portion arranged in the direction of fluid flow to thereafter turn around the valve shaft of the intake valve and cross the plane again from said other side to said one side of the plane.

2. An internal combustion engine as claimed in claim 1 wherein, by the arrangement of the entrance portion of the intake port being placed completely out of the plane, the turning portion has a degree of turning which is large.

3. An internal combustion engine as defined in claim 1 wherein the axis of the major flow of the intake air is substantially parallel to the plane at the entrance portion of the intake port.

4. An internal combustion engine as defined in claim 1 wherein the shape of the intake port has a configuration similar to a question mark "?".

5. An internal combustion engine as defined in claim 1 wherein the turning portion turns around the valve shaft at an angle more than 180 degrees so that an air intake passage in the turning portion is very long.

* * * * *